April 25, 1961

R. T. CORNELIUS 2,981,280

PRESSURE REGULATING VALVES

Filed Feb. 3, 1958

Inventor
RICHARD T. CORNELIUS
By Caswell & Lagaard
ATTORNEYS

United States Patent Office 2,981,280
Patented Apr. 25, 1961

2,981,280
PRESSURE REGULATING VALVES
Richard T. Cornelius, Minneapolis, Minn., assignor to The Cornelius Company, Minneapolis, Minn., a corporation of Minnesota
Filed Feb. 3, 1958, Ser. No. 712,895
2 Claims. (Cl. 137—505.26)

The herein disclosed invention relates to pressure regulating valves and particularly to a valve mechanism having a valve body with a diaphragm of flexible material carried thereby, a mounting carried by said diaphragm, a spring acting between said body and mounting, means forming in the body a valve chamber, a pressure chamber, an inlet and an outlet communicating with said chambers, and a passageway extending between said chambers, a valve seat chamber encircling said passageway, and a valve head in said chamber adapted to seat against said valve seat.

An object of the invention resides in providing a valve stem acting between said mounting and valve head and serving to unseat the valve head upon movement of said mounting in one direction.

Another object of the invention resides in providing a construction whereby the valve stem is yieldingly held in engagement with the valve head to accommodate lateral movement of said valve stem at said valve head occasioned by the unequal pressure of the spring on said mounting.

An object of the invention resides in providing a flexible guide for the portion of the spring adjacent the valve seat yieldable laterally to relieve lateral pressure on the valve stem.

Another object of the invention resides in providing a flexible socket carried by the mounting and supporting the opposite end of the valve stem for swinging movement.

A feature of the invention resides in constructing the guide as a collar encircling the valve stem and with an annular narrow edge engaging the valve stem and readily yieldable radially.

Other objects of the invention reside in the novel combination and arrangement of parts and in the details of construction hereinafter illustrated and/or described.

Figure 1:
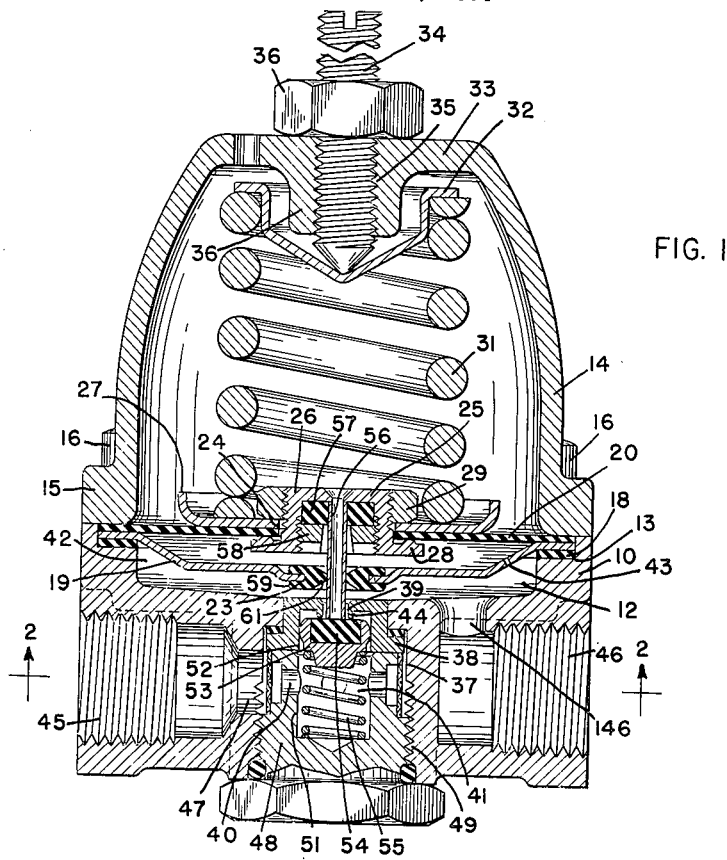
Fig. 1 is a longitudinal elevational-sectional view taken on line 1—1 of Fig. 2.
Figure 2:
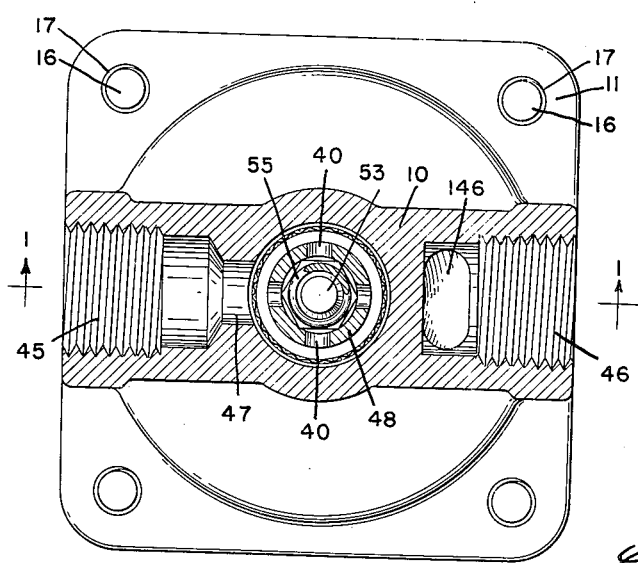
Fig. 2 is a plan sectional view taken on line 2—2 of Fig. 1.

The invention proper consists of a body 10 constructed as a casting and having a flange 11 extending outwardly therefrom. This body is constructed with a depression 12 in the upper portion of the same which extends through said flange and into said body. This depression terminates in an annular rabbet 13 at the upper portion of the same. Overlying the flange 11 is a cup-shaped cover 14 which has a flange 15 overlying the flange 11. The cover 14 is secured to the body 10 by means of screws 16 which pass through the flange 15 and are screwed into tapped holes 17 in the flange 11. Extending across the depression 12 and into the rabbet 13 is a gasket 18, a plate 19, and a diaphragm 20. The diaphragm 20 is constructed of rubber or some other similar flexible material, while the plate 19 is preferably constructed of metal. This plate is dish-shaped in form having an offset center portion 22 with an opening 23 extending therethrough. These various parts are tightly clamped between the flange 15 and the flange 11 so as to hold the parts in operative relation.

The diaphragm 20 has attached to it a mounting 25 which consists of a threaded bushing 26 extending through an opening 24 in said diaphragm. The mounting 25 also includes a spring seat 27, plate-like in form, and through which the bushing 26 extends. Bushing 26 is constructed with a flange 28 which engages the diaphragm 20 on the under side thereof. A nut 29 screwed on the bushing 26 clamps the mounting 25 to the diaphragm and rigidly connects the parts together. A heavy coil spring 31 is mounted within the cover 14 and has one end seated against the spring seat 27 and its other end against another spring seat 32 which is disposed near the outer end 33 of said cover. A screw 34 is screwed into threads 35 formed in a boss 36 issuing inwardly from the end 33 of said cover and engages the spring seat 32 to vary the pressure on the diaphragm 20 resulting from said spring. A lock nut 36 mounted on the screw 34 engages the end 33 of cover 14 and holds the screw 34 in adjusted position.

In the body 10 is formed a bore 37 and in which is mounted a flanged bushing 38 having a bore 52 therein and a passageway 39 communicating therewith. The depression 12 in said body forms therein a pressure chamber 42. The plate 19 extends through this chamber and the upper and lower portions of said chamber are brought into communication by means of an opening 43 in the plate 19. The passageway 39 in bushing 38 also communicates with chamber 42 and is encircled by a valve seat 44.

The bushing 38 is held in place within the bore 37 by means of a cap 48 which is screwed into threads 49 formed in the lower end of the bore 37 of body 10 and which engages the end of said bushing. This cap has a bore 51 lying in continuation of the bore 52. The bores 51 and 52 form a valve chamber 41. Formed in the body 10 is an outlet 46 which communicates through a passageway 146 with the pressure chamber 42. Also formed in said body is an inlet 45 which communicates with the valve chamber 41 through a passageway 47 in said body communicating with bore 37 and passageways 40 in the cap 48 communicating with bore 51 and the valve chamber 41. Within the bore 52 is mounted a valve head 53 and which has an insert 54 constructed of nylon or some other similar slightly elastic wear resistant material. This insert is adapted to engage the valve seat 44 and to close communication between the pressure chamber 42 and the valve chamber 41. A compression coil spring 55 mounted in the bore 51 of cap 48 engages the valve head 53 and urges the same into closing position.

Acting between the mounting 25 and the valve head 53 is a valve stem 56. This valve stem is seated at its upper end in a socket 57 constructed of rubber or some other similar flexible material carried by mounting 25. An annular nut 58 screwed into suitable threads formed in the bushing 26 hold the socket 57 in place in said bushing. Mounted in the opening 23 of the plate 19 is a guide 59 in the form of a collar which has a narrow inner edge 61 and which engages the lowermost portion of the valve stem 56 and guides said valve stem for axial movement. This edge is radially yieldable and the valve stem may have radial movement within the passageway 39 so as to avoid undue strain on said valve stem occasioned by the irregular pressure produced on mounting 25 by the spring 31.

The operation of the invention is as follows: When the pressure in outlet 46 decreases, pressure in the pressure chamber 42 also decreases. Spring 31 then exerts a pressure which overcomes the pressure on diaphragm 20 in pressure chamber 42 and the diaphragm 20 descends. Mounting 25 now exerts a pressure on valve stem 56 which unseats valve head 53 and brings the pressure chamber 42 into communication with the valve chamber 41 through passageway 39 which chamber communicates with the inlet 45 through bore 51 in cap 48 and passageways 40 and 47. Fluid under pressure now enters the chamber 42 and the pressure therein continues to rise until diaphragm 20 raises sufficiently to allow spring 55 to close the valve.

The advantages of the invention are manifest. The valve stem is relieved from lateral pressure occasioned by the irregular pressure on the mounting carried by the diaphragm. The valve stem is free to move laterally to an extent limited by the radially yieldable guide so that no lateral strain is imposed on the same. The valve is exceedingly sensitive and can be used with high pressures.

Changes in the specific form of the invention, as herein described, may be made within the scope of what is claimed without departing from the spirit of the invention.

Having described the invention, what is claimed as new and desired to be protected by Letters Patent is:

1. In a valve mechanism comprising a valve body, a diaphragm of flexible material carried thereby, a mounting carried by said diaphragm, a spring acting between said valve body and mounting and urging said mounting for movement in one direction, means forming in said body a pressure chamber adjacent said diaphragm and a valve chamber, means forming a passageway in said body communicating with said pressure chamber and said valve chamber, a valve seat in said valve chamber encircling said passageway and spaced from said mounting, an inlet and an outlet in said body, one communicating with said pressure chamber and the other with said valve chamber, a valve head in said valve chamber adapted to seat against said valve seat, a valve stem acting between said mounting and valve head and serving to unseat said valve head upon movement of said diaphragm in the direction urged by said spring, the combination of an attaching member of resilient material secured to said mounting and engaging said valve stem at one end, a centering guide of resilient material encircling said valve stem at a locality removed from said attaching member and closely engaging said valve stem and guiding said valve stem for sliding longitudinal movement, means for supporting said guide in fixed relation relative to said body, said guide normally holding said valve stem in centric position and being yieldable radially to accommodate swinging movement of said valve stem about a center substantially at its locality of issuance from said mounting, said stem extending through said passageway and fitting loosely therein.

2. In a valve mechanism comprising a valve body, a diaphragm of flexible material carried thereby, a mounting carried by said diaphragm, a spring acting between said valve body and mounting and urging said mounting for movement in one direction, means forming in said body a pressure chamber adjacent said diaphragm and a valve chamber, means forming a passageway in said body communicating with said pressure chamber and said valve chamber, a valve seat in said valve chamber encircling said passageway and spaced from said mounting, an inlet and an outlet in said body, one communicating with said pressure chamber and the other with said valve chamber, a valve head in said valve chamber adapted to seat against said valve seat, a valve stem acting between said mounting and valve head and serving to unseat said valve head upon movement of said diaphragm in the direction urged by said spring, the combination of an attaching member of resilient material secured to said mounting and engaging said valve stem at one end, a centering guide of resilient material encircling said valve stem at a locality removed from said attaching member and having an inner narrow edge closely engaging said valve stem and guiding said valve stem for sliding longitudinal movement, means for supporting said guide in fixed relation relative to said body, said guide normally holding said valve stem in centric position and being yieldable radially to accommodate swinging movement of said valve stem about a center substantially at its locality of issuance from said mounting, said stem extending through said passageway and fitting loosely therein.

References Cited in the file of this patent

UNITED STATES PATENTS

| | | |
|---|---|---|
| 1,775,999 | Haseloff | Sept. 16, 1930 |
| 2,069,297 | Abercrombie et al. | Feb. 2, 1937 |
| 2,509,504 | Jensen | May 30, 1950 |
| 2,650,455 | Jacobsson et al. | Sept. 1, 1953 |
| 2,652,241 | Williams | Sept. 15, 1953 |
| 2,661,578 | Niesemann | Dec. 8, 1953 |
| 2,663,122 | Cornelius | Dec. 22, 1953 |
| 2,876,793 | Vanderpoel | Mar. 10, 1959 |